US012432175B2

(12) United States Patent
Thumma et al.

(10) Patent No.: US 12,432,175 B2
(45) Date of Patent: Sep. 30, 2025

(54) SYSTEMS AND METHODS FOR DISTRIBUTING EVENT DRIVEN NETWORK SERVICES

(71) Applicant: MASTERCARD INTERNATIONAL INCORPORATED, Purchase, NY (US)

(72) Inventors: Bharat Reddy Thumma, O'Fallon, MO (US); Jim Maus, St. Charles, MO (US); Jun Zou, Fremont, CA (US); Belgi K. Augustine, McKinney, TX (US); Jian Zhang, Manalapan, NJ (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 517 days.

(21) Appl. No.: 17/749,537

(22) Filed: May 20, 2022

(65) Prior Publication Data

US 2022/0377052 A1    Nov. 24, 2022

Related U.S. Application Data

(60) Provisional application No. 63/191,692, filed on May 21, 2021.

(51) Int. Cl.
*G06F 9/00* (2018.01)
*G06F 15/16* (2006.01)
(Continued)

(52) U.S. Cl.
CPC ........ *H04L 63/0209* (2013.01); *H04L 63/166* (2013.01)

(58) Field of Classification Search
CPC ...... H04L 63/0209; H04L 63/166; H04L 9/40
(Continued)

(56) References Cited

U.S. PATENT DOCUMENTS 10,833,881 B1 * 11/2020 Jindal .................. H04L 63/102
11,580,546 B2     2/2023  Murray
(Continued)

OTHER PUBLICATIONS

Kusedghi: XeniumNFV_A United, Dynamic, Distributed and Event-Driven SDN; IEEE pp. 320-326; 2018; 7 pgs.
(Continued)

*Primary Examiner* — Jeffrey C Pwu
*Assistant Examiner* — Samuel Ambaye
(74) *Attorney, Agent, or Firm* — Harness, Dickey & Pierce, P.L.C.

(57) ABSTRACT

Systems and methods are provided for use in providing messaging among different regions, via a distributed event drive architecture. One exemplary method includes receiving, at an event gateway in a region, a network message from a different event gateway in a different region, via a persistent connection between the event gateway and the different event gateway, and validating, by the event gateway, the network message based on at least a certificate associated with the network message. The method also includes, in response to validation of the network message, converting, by the event gateway, the network message to an event and publishing, by the event gateway, the event to the message bus, thereby providing the event associated with the network message to a service to which the network request is directed.

13 Claims, 4 Drawing Sheets

(51) Int. Cl.
  *G06F 17/00* (2019.01)
  *H04L 9/40* (2022.01)
(58) Field of Classification Search
  USPC .......................................................... 726/12
  See application file for complete search history.

(56) References Cited

U.S. PATENT DOCUMENTS

| | | | |
|---|---|---|---|
| 2007/0165625 A1* | 7/2007 | Eisner | H04L 67/561 |
| | | | 370/389 |
| 2018/0007035 A1* | 1/2018 | Zhang | H04L 9/3268 |
| 2018/0287969 A1* | 10/2018 | Broadhurst | H04L 51/214 |
| 2019/0095608 A1 | 3/2019 | Kohli | |
| 2019/0266599 A1 | 8/2019 | O'Sullivan et al. | |
| 2020/0244770 A1* | 7/2020 | Cooley | H04L 41/5054 |
| 2021/0192476 A1 | 6/2021 | Swaminathan | |
| 2021/0398124 A1 | 12/2021 | Bhasin et al. | |
| 2022/0084031 A1 | 3/2022 | Hou et al. | |
| 2022/0114593 A1 | 4/2022 | Johnson et al. | |
| 2022/0114594 A1 | 4/2022 | Nunes et al. | |
| 2022/0215392 A1 | 7/2022 | Wied et al. | |
| 2022/0374892 A1 | 11/2022 | Maus et al. | |

OTHER PUBLICATIONS

Zhang: Integrating Events into SOA for IoT Services; IEEE pp. 180-186; 2017; 7 pgs.

* cited by examiner

SYSTEMS AND METHODS FOR DISTRIBUTING EVENT DRIVEN NETWORK SERVICES

CROSS-REFERENCE TO RELATED APPLICATION

This application claims the benefit of, and priority to, U.S. Provisional Application No. 63/191,692, filed May 21, 2021. The entire disclosure of the above application is incorporated herein by reference.

FIELD

The present disclosure generally relates to systems and methods for providing distributed event driven network services between different regions through event gateways disposed in the regions.

BACKGROUND

This section provides background information related to the present disclosure which is not necessarily prior art.

Networks are known to provide various services, depending, for example, on types of the networks. In connection with payment networks, the networks are known to coordinate communications between different institutions to facilitate fund transfers, whereby the payment networks provide processing services. The communications involve messaging, which may be local to given regions or which may be between multiple regions. In general, the services are known to rely on message driven architectures, wherein the recipients of the messaging await the arrival of the messaging and then react. In connection therewith, originators of the messaging are responsible for properly directing the messaging and also conforming with regulations related to the messaging.

DRAWINGS

The drawings described herein are for illustrative purposes only of selected embodiments and not all possible implementations, and are not intended to limit the scope of the present disclosure.

Figure 1:
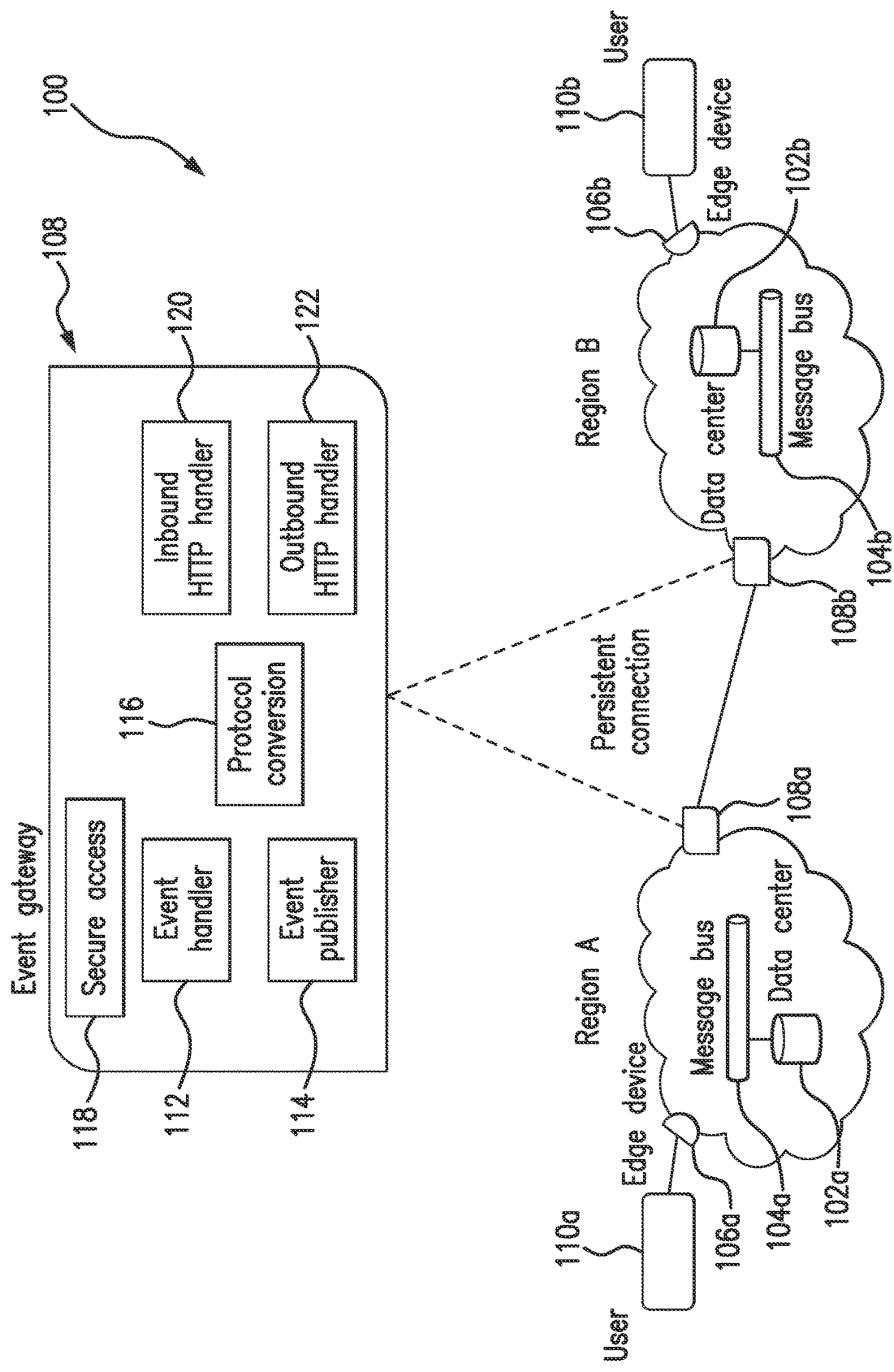
FIG. 1 is a block diagram of an exemplary system of the present disclosure suitable for use in providing messaging between different regions, over a wide area network (WAN), through one or more event gateways disposed in the different regions.
Figure 3:
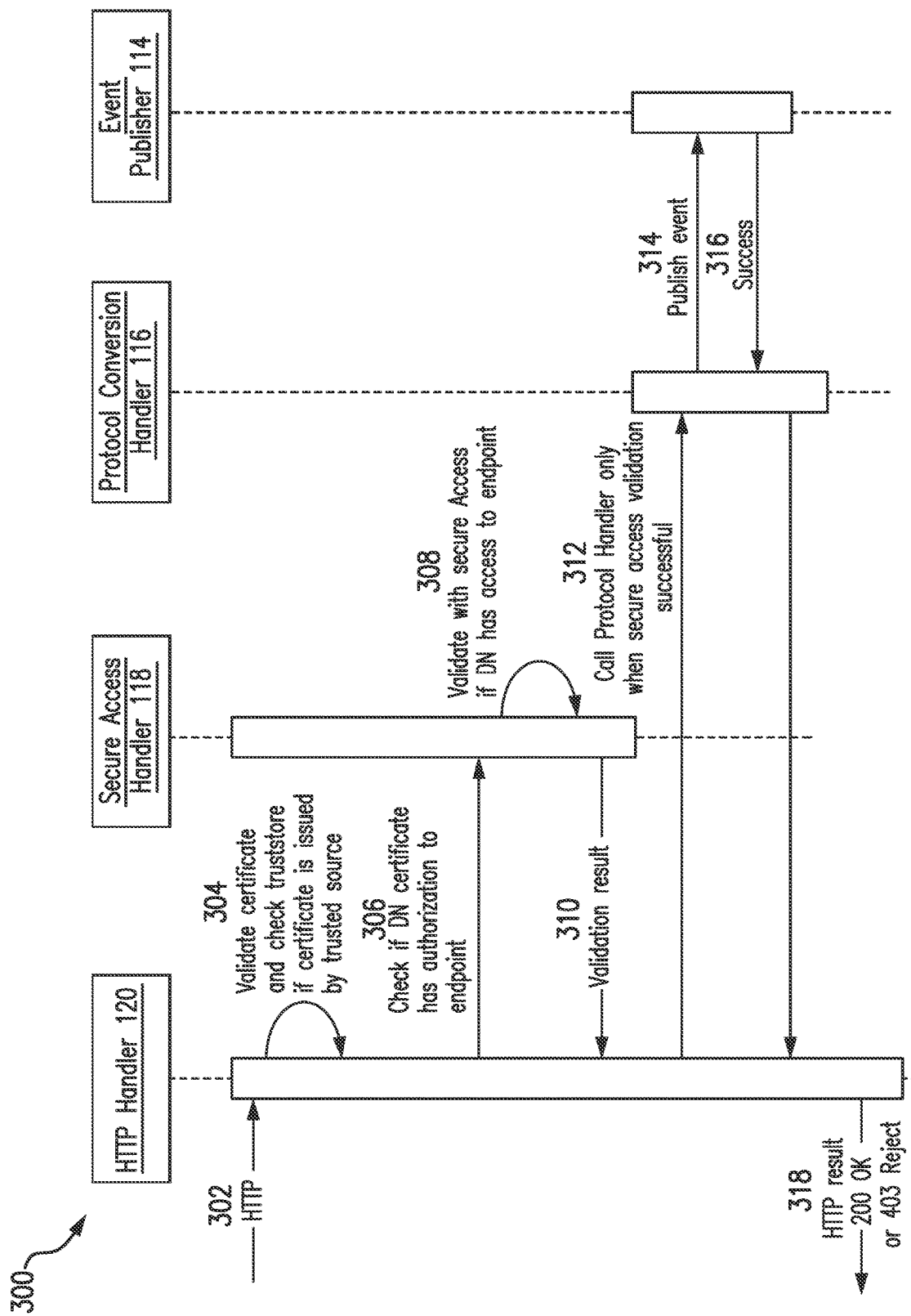
Figure 4:
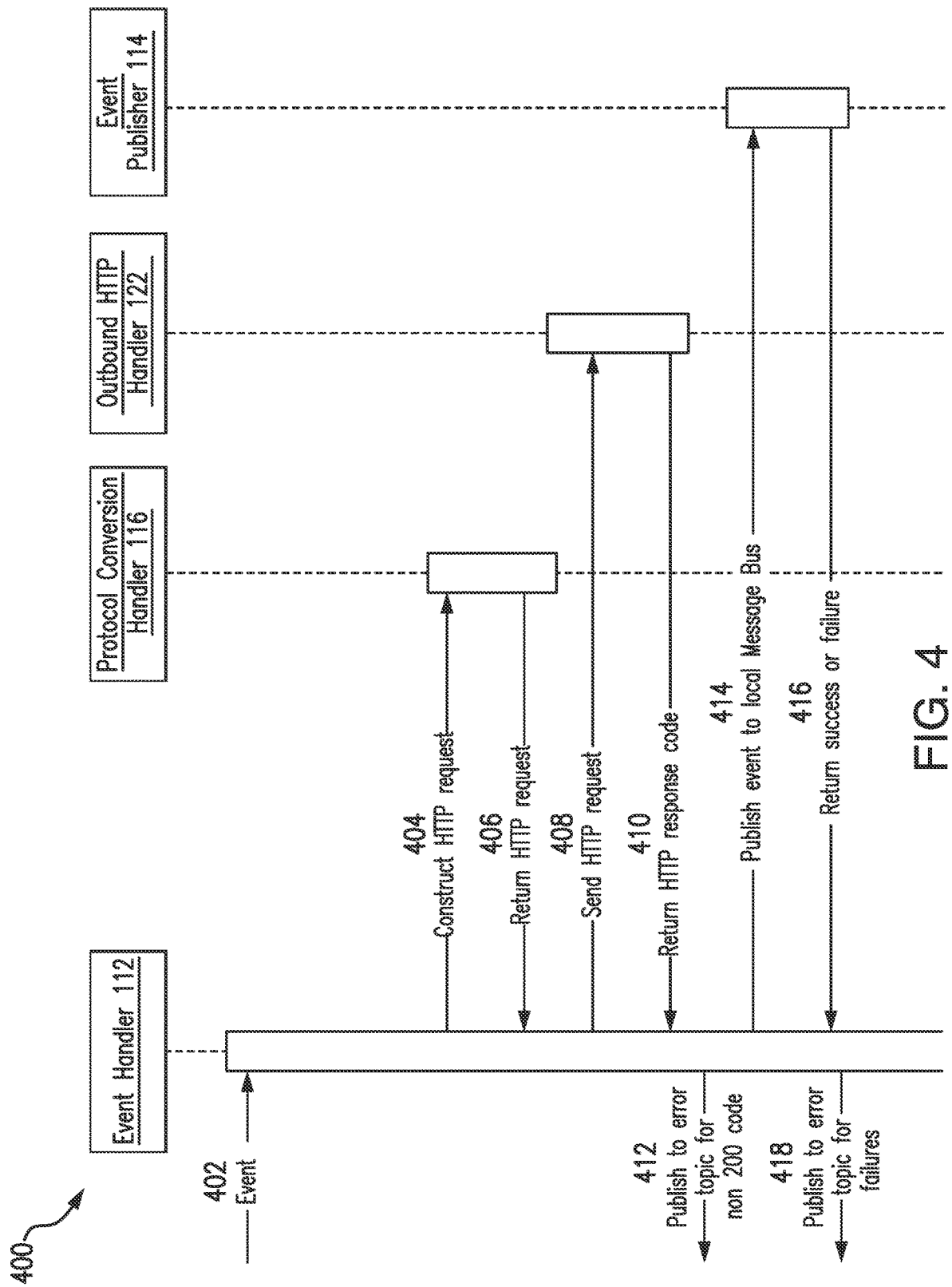

FIG. 3 is an exemplary method, which may be implemented in connection with the system of FIG. 1, for use in receiving an inbound message from a region, at an event gateway, and publishing an event for the message to a message bus at a different region; and FIG. 4 is an exemplary method, which may be implemented in connection with the system of FIG. 1, for use in transmitting an outbound message, from an event gateway at a region, to a different region.

Corresponding reference numerals indicate corresponding parts throughout the several views of the drawings.

DETAILED DESCRIPTION

Exemplary embodiments will now be described more fully with reference to the accompanying drawings. The description and specific examples included herein are intended for purposes of illustration only and are not intended to limit the scope of the present disclosure.

Networks often provide services in conjunction with processing purchase transactions by consumers, businesses, governments, etc. (all broadly users). The services may be directly related to processing of the transactions (e.g., authorization, clearing, settlement, etc.) (e.g., ACH transactions, etc.), or they may relate indirectly to the transactions (or may be independent of the transactions) as value added services (e.g., digital identity services, marketing services, fraud prevention services, reward services, loyalty services, consumer insight services, account control services, authentication services, etc.), etc. In connection therewith, for services implemented in regions different from those in which the transactions occurred, the availability of the services or the services themselves may be impacted by regulations intended to limit the flow of personal information between the different regions (e.g., on-soil regulations, etc.). In such scenarios, the regions may be referred to as regulatory domains, whereby the regulations impose limitations on underlying performance of the services.

Uniquely, the systems and methods herein allow for an event-driven messaging architecture, in which messaging associated with different regions (restricted by regulations, etc.) are managed by one or more event gateways and published into the regions associated with the services invoked by the messaging. In this manner, the event driven architecture provides for distributed services, while relying on the event gateway(s) to coordinate events among the different regions and to account for regulatory requirements among the regions. As such, the services rely on the event driven architecture (e.g., publishing events to a message bus in a local region, etc.) to alleviate the need to deal with any physical endpoints and/or associated regulatory requirements of the region in which the physical endpoints are located.

FIG. 1 illustrates an exemplary system 100, in which the one or more aspects of the present disclosure may be implemented. Although the system 100 is presented in one arrangement, other embodiments may include the parts of the system 100 (or other parts) arranged otherwise depending on, for example, services associated with payment accounts and payment account transactions, regulations, etc.

As shown in FIG. 1, the system 100 generally includes two regions, Region A and Region B. In this exemplary embodiment, the regions are geographically distinct. As such, region A may include the United States, or North America, and Region B may include Germany, or Europe. The regions may be subject to various regulations, including, for example, on-soil regulations related to restrictions on transmitting of personal information out of the regions. The regions may also be associated with other regulations, related to transmission of information or otherwise, etc. As such, the regions may further be referred to as availability zones (AZs) or regulatory domains for particular information. The network cloud symbols illustrated in FIG. 1, in connection with the Regions A, B, may be generally understood to be a payment network disposed in the regions (whereby the clouds in Region A and Region B form a single payment network across the multiple regions). The payment network is further configured, generally, to coordinate payment account transactions between users (e.g., acquirer banks, issuer banks, etc.), and may further be configured to provide services described in more detail below.

That said, within each of the Regions A, B, the system 100 includes data centers 102a, 102b forming part of the payment network. The data centers 102*a*, 102*b* each include one or more computing devices, which are configured to provide one or more services associated with the payment network. The services may relate to, specifically, transaction processing, whereby the services may include processing transaction messaging (e.g., related to transaction authorization, etc.), fraud prevention, etc. And, the data centers 102*a*, 102*b* are generally on-premises data centers at the payment network in this exemplary embodiment, but may also include customer data centers, or cloud-based data centers, etc., in other embodiments. The data centers 102*a*, 102*b* may provide other services, which may be redundant from Region A to Region B, or not, whereby requests for certain service(s) may be directed from one region to another. What's more, users of one or more services may be located in different regions, whereby requests for certain service(s) may be directed from one region to another, as described in more detail below. The services are referred to herein as applications, which are associated with topic names (e.g., where the topics may include metadata topics with directions/addresses for processing and/or where the topics may include indications of the different regions with which the applications are to be directed (e.g., via a message broker, etc.), etc.).

The Regions A, B in FIG. 1 further include message buses (or message spines) 104*a*, 104*b* coupled to respective ones of the data centers 102*a*, 102*b*. Each of the message buses 104*a*, 104*b* is configured to permit the corresponding data center 102*a*, 102*b* to access events published to the message buses 104*a*, 104*b* with a topic name specific to the application hosted by the data centers 102*a*, 102*b*.

Further, the message buses 104*a*, 104*b* are coupled to edge devices 106*a*, 106*b* and event gateways 108*a*, 108*b* (e.g., wide area event emitters (WAEEs), etc.). The edge devices 106*a*, 106*b* are commutatively coupled to one or more customers (or users 110*a*, 110*b*). As shown in FIG. 1, for example, the edge device 106*a* is coupled to the user 110*a*, which is likewise located in Region A, and the edge device 106*b* is coupled to the user 110*b*, which is located in Region B. The edge devices 106*a*, 106*b* are configured to receive messages from the users 110*a*, 110*b*, to provide the messages to the message buses 104*a*, 104*b*, and to transmit messages from the message buses 104*a*, 104*b* to the users 110*a*, 110*b*. That said, the users 110*a*, 110*b* may include individual users (e.g., persons, etc.), or entity users such as, for example, financial institutions (e.g., banking institutions, etc.), relying parties, etc. In general, the types of the users 110*a*, 110*b* may depend on the type of service(s) to be accessed by the users 110*a*, 110*b*.

The event gateways 108*a*, 108*b* included in the system 100 are configured to coordinate communication between different regions, whereby the event gateways 108*a*, 108*b* are the ingress and egress points for the message buses 104*a*, 104*a* from/to the different Regions A, B. While each of the Regions A, B in the system 100 is illustrated as including only one event gateway 108*a*, 108*b*, it should be appreciated that multiple instances of the event gateways 108*a*, 108*b* may be included, per region. It should be understood, that where multiple instances of the event gateways 108*a*, 108*b* are employed in one or more of the Regions A, B, the system 100 may further include load balancers at the front ends of the event gateways 108*a*, 108*b* to balance HTTP requests/traffic among the different instances. As such, it should further be appreciated that the event gateways 108*a*, 108*b* may be physical devices located at the payment network, or cloud-based instances hosted by the payment network or a third party, etc., in various system embodiments. In this exemplary embodiment, each of the event gateways 108*a*, 108*b* is configured to subscribe to application topics on the local message buses 104*a*, 104*b* and to transmit application events to the remote destination via network requests (e.g., consistent with HTTP protocol, etc.) to the other event gateways in other regions. The event gateways 108*a*, 108*b* are further configured to handle incoming HTTP requests, to ensure authentication and authorization, and to publish messages to application topics in the local message buses 104*a*, 104*b*.

Each of the event gateways 108*a*, 108*b* is illustrated in more detail in FIG. 1 (at 108), as indicated by the dotted lines. As shown in this embodiment, each of the event gateways 108*a*, 108*b* includes, for example, an event handler 112, an event publisher 114, a protocol conversion handler 116, a secure access handler 118, an inbound HTTP handler 120 and an outbound HTTP handler 122. The event handler 112 and the event publisher 114 are configured to interact with the message buses 104*a*, 104*b*. In particular, the event handler 112 is configured to consume messages from the message buses 104*a*, 104*b* (directed to the event gateways 108*a*, 108*b*) and to call the outbound HTTP handler 122 to provide messages to another region, or to the event publisher 114 to provide messages in the same region. The event publisher 114 is configured to publish events to the message buses 104*a*, 104*b* to a relevant topic based on information included in the request from the inbound HTTP handler 120. The protocol conversion handler 116 is configured to parse an event message and construct a network request, or more specifically, in this embodiment, an HTTP request, and vice versa. The secure access handler 118 is configured to provide authentication of incoming traffic (e.g., via certificates issued to the associated applications, etc.). The inbound HTTP handler 120 is configured to process incoming HTTP traffic from other event gateways in other regions, and to authenticate and authorize the incoming request(s). And, the outbound HTTP handler 122 is configured to send network requests, in this embodiment, HTTP requests, to event gateways in other regions, to manage the persistent connections to the other event gateways in other regions listed in a configuration (e.g., creating, refreshing, and destroying connections, at one or more regular, or irregular, time intervals; etc.).

It should be appreciated that the parts of each of the event gateways 108*a*, 108*b* are illustrated for purposes of illustration only, and while the parts may be separate divisions of executable instructions (e.g., modules, etc.) in this embodiment, the event gateway 108*a* and/or the event gateway 108*b* may be organized differently, in different divisions, in other embodiments.

Consistent with the above, the event gateways 108*a*, 108*b*, generally, are configured to initially publish a startup event to the message buses 104*a*, 104*b*, thereby indicating activation, etc. to available applications in the region that have a need to transmit messages to other regions (via a network, etc.). The startup event may, for example, include startup as the topic name or signal topic of the event (e.g., the event gateway 108*a* and/or 108*b* may publish a startup event on a WAEE-STARTUP signal topic, etc.). In turn (e.g., in response to the startup event published by the event gateways 108*a*, 108*b*, etc.), the application(s) included at the data centers 102*a*, 102*b* (also referred to as service(s)) (that have the need to transmit messages to other regions) are then configured to publish events to the message buses 104*a*, 104*b* on the signal topic for the event gateways 108*a*, 108*b* (e.g., on the APP-WAEE signal topic, etc.). These events include application topic names, remote destination hostnames and routing policies, etc. The event gateways 108*a*, 108*b* are configured to identify the events on the message buses 104*a*, 104*b*, and to update a local cache with the events. Thereafter, the event gateways 108*a*, 108*b* are configured to subscribe to the topics (e.g., the APP-WAEE signal topics, etc.) and to create persistent connections (e.g., HTTP/2 connections, etc.) with each of the hostnames in the signaling events from the applications and included in the local cache (e.g., a hostname is resolved to the VIP of the target WAEE load balancer, by talking to the local DNS server, etc.). In this way, a topic name is mapped to a remote hostname.

For instance, an event may be published to Topic A by Service A in Region A (e.g., a cross-border transaction in Europe (Region A) may be picked up in Euros at edge device 106*a*, but indicate handling in the United States (Region A), such that a corresponding topic may be "Service-A-US"; etc.). The event gateway 108*a* in Region A is already listening to Topic A and knows the remote hostname to which the event needs to be transmitted (e.g., in the above cross-border transaction, the transaction is initially directed to the event gateway 108*a*; etc.). The event gateway 108*a* in Region A sends the event to the remote event gateway 108*b* in Region B by using the already established persistent connection (e.g., the already established HTTP/2 connection, etc.) (e.g., in the above cross-border transaction, the event gateway 108*a* identifies the event gateway 108*a* in Region A (the United States) based on identification of the United States in the topic; etc.). The event gateway 108*b* in Region B publishes the event to the topic specified in the HTTP URL (e.g., as the topic name is the same as the resource name in the HTTP URL, etc.), to the message bus 104*b* of Region B. Applications in Region B, included in the data center 102*b*, pick up the event(s) from the topics that it/they is/are subscribing to in Region B (message bus 104*b* in Region B) and then start(s) processing the event(s). In connection therewith, the event gateways 108*a*, 108*b* are each configured to employ mutual transport layer security (or MTLS) for authentication of the HTTP requests.

As an example operation in the system 100, at startup, in response to an event from the data center 102*a* (having a hostname specific to the data center 102*b*), the event gateway 108*a* is configured to create a persistent connection with the event gateway 108*b* and to authenticate, via MTLS.

The event gateway 108*a* is then able to use the persistent connection to provide HTTP requests (e.g., including a URL of the application at the data center 102*b*, etc.) to the event gateway 108*b*, and more generally, into Region B. In response, the event gateway 108*b* is configured to receive the HTTP request, and using the secure access layer, to determine whether the event gateway 108*a* is authorized to access the URL specified in the request (e.g., per topic, etc.) (e.g., based on an identifier associated with the event gateway 108*a*, etc.). For example, the event gateway 108*b* may determine whether the event gateway 108*a* is authorized by checking whether the distinguished name (DN) present in the certificate provided by the event gateway 108*a* is mapped for authorization to access the URL specified in the request (e.g., as a regular distinguished name security check, etc.). A security policy may be periodically updated in all event gateways, which specifies which distinguished names have access to each specific event gateway (e.g., based on one more mappings of distinguished names, etc.). Then, if the event gateway 108*a* is authorized, the event gateway 108*b* may be configured to inspect content of the request and/or to scan the request for any known security threats and malicious content (e.g., consistent with firewall rules, etc.).

With this validation (e.g., authorized, inspected, and scanned, etc.), when successful, the event gateway 108*b* is configured to convert the request to an event and to publish an event to the message bus 104*b* (with the topic name of the event being the same as the resource name in the URL of the request). Further, the event gateway 108*b* is configured to transmit a response (e.g., HTTP response, etc.) back to the event gateway 108*a*, where the response includes a status code (e.g., 200, etc.). In turn, the event gateway 108*a* (and/or the event gateway 108*b*) is configured to record a message delivery confirmation (e.g., for inbound and outbound messages, etc.) to a log stream for auditing purposes. And, the data center 102*b* is configured to identify the event on the message bus 104*b* and to invoke the associated service/application to respond accordingly.

In addition to the above, it should be appreciated that the system 100 also may include a health endpoint (not shown) which is configured to check the health of the event gateways 108*a*, 108*b* and to compose one or more new event gateways, as needed, based on traffic and/or health of existing event gateways, etc. For example, the number of event gateway instances (e.g., WAEE instances, etc.), etc., may be increased when message bus traffic exceeds a threshold.

While the above is presented relative to a request and a message, it should be appreciated that the request may be related to any number of services and/or applications. For example, the request may be for authorization of a transaction, whereby the request originates at the user 110*a* and is directed to the user 110*b*. The authorization reply for the transaction is handled in the same manner, but in the opposite direction. In general, applications/services will specify the remote destinations to a pathway is needed. For example, a card-switching application may need pathways in such a manner that edge device instances are connected to one or more event gateways in the region, which in turn are connected (e.g., via persistent connection, etc.) to event gateways in other regions (e.g., other regulatory domains, etc.). Another application may need different pathways where an edge device is connected to another edge device (not shown) in the same region (e.g., where users are in the same region, etc.). The pathways are included in the events published to the message buses, and realized by the edge devices and event gateways coupled to the message buses.

It should be appreciated that much like an event gateway, when a new application, or a new destination hostname is available, the application is configured to publish an event (including the topic name, hostname, routing policies, etc.), whereby the event gateway may be configured to create a connection to the new remote destination, or event gateway, or to recognize traffic directed to the new application in the region, etc.

It should further be understood that while only two Regions A, B are shown in FIG. 1, other system embodiments will generally include further regions, each at least partially consistent with the regions shown in FIG. 1 and associated with multiple users.

Moreover, it should also be appreciated that each of the parts illustrated in the regions of the system 100 are coupled together (to permit the communications described herein), via one or more networks. The one or more networks may include, without limitation, one or more of a local area network (LAN), a wide area network (WAN) (e.g., the Internet, etc.), a mobile network, a virtual network, and/or another suitable public and/or private network capable of supporting communication among two or more of the parts illustrated in FIG. 1, or any combination thereof. In general, the parts in one region are coupled to the parts in another region, however, via one or more persistent connection(s) between the respective event gateways in the regions, whereby all traffic between the regions is coordinated through the persistent connection(s) and the event gateways. What's more, the data centers 102a, 102b may be coupled to respective event gateways 108a, 108b via private network connections (e.g., ExpressRoute, by Microsoft® Azure, etc.).

Figure 2:
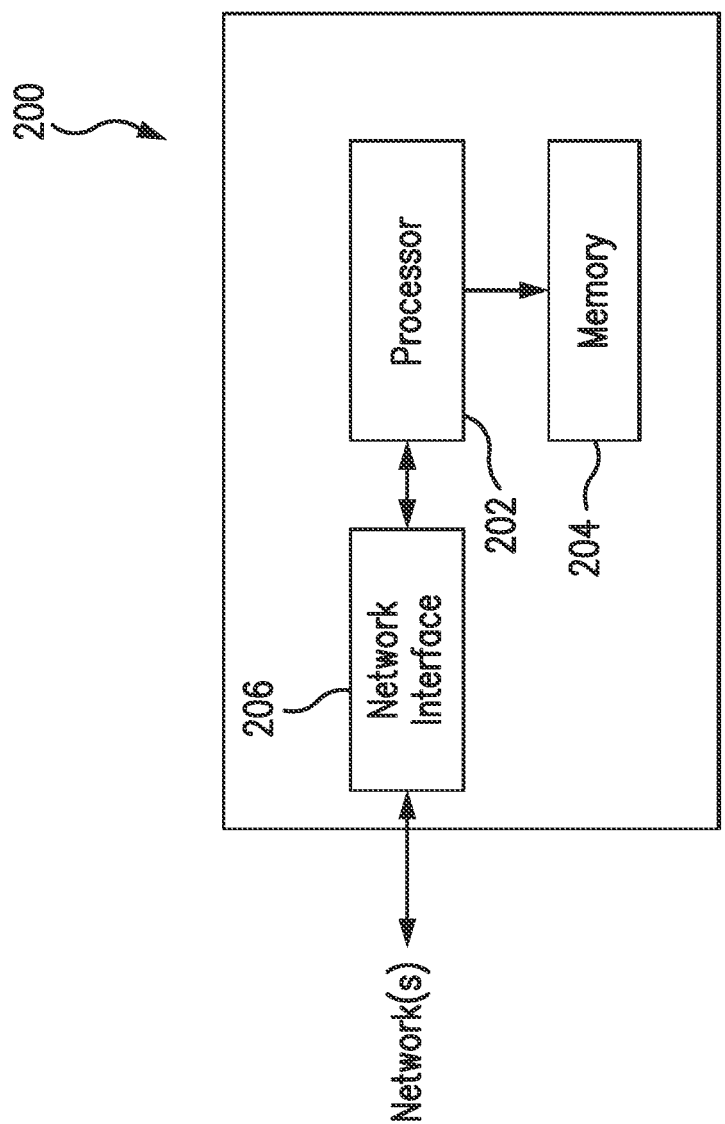
FIG. 2 is a block diagram of a computing device that may be used in the exemplary system of FIG. 1.

FIG. 2 illustrates an exemplary computing device 200 that can be used in the system 100. The computing device 200 may include, for example, one or more servers, workstations, computers, laptops, etc. In addition, the computing device 200 may include a single computing device, or it may include multiple computing devices located in close proximity or distributed over a geographic region, so long as the computing devices are configured to function as described herein. In the system 100, the data centers 102, the message buses 104, the edge devices 106, the event gateways 108 and the users 110 each may include, or be implemented in, one or more computing devices generally consistent with the computing device 200. However, the system 100 should not be considered to be limited to the computing device 200, as described below, as different computing devices and/or arrangements of computing devices may be used. In addition, different components and/or arrangements of components may be used in other computing devices.

Referring to FIG. 2, the exemplary computing device 200 includes a processor 202 and a memory 204 coupled to (and in communication with) the processor 202. The processor 202 may include one or more processing units (e.g., in a multi-core configuration, etc.). For example, the processor 202 may include, without limitation, a central processing unit (CPU), a microcontroller, a reduced instruction set computer (RISC) processor, an application specific integrated circuit (ASIC), a programmable logic device (PLD), a programmable gate array (e.g., a field programmable gate array (FPGA), etc.), a system on chip (SOC), and/or any other circuit or processor capable of the operations described herein. In the system 100, for example, each of the edge devices 106a, 106b may include a hardware processor, such as, for example, an FPGA, PLD, ASIC, etc., whereby operations performed thereby are implemented directly in hardware in the device, rather than in software in a general purpose processor, as described more below.

The memory 204, as described herein, is one or more devices that permit data, instructions, etc., to be stored therein and retrieved therefrom. The memory 204 may include one or more computer-readable storage media, such as, without limitation, dynamic random access memory (DRAM), static random access memory (SRAM), read only memory (ROM), erasable programmable read only memory (EPROM), solid state devices, flash drives, CD-ROMs, thumb drives, floppy disks, tapes, hard disks, and/or any other type of volatile or nonvolatile physical or tangible computer-readable media. The memory 204 may be configured to store, without limitation, transaction data, account information, service data structures (e.g., loyalty points, fraud scores, account control rules, etc.) related to the services 110 (and/or others), and/or other types of data (and/or data structures) suitable for use as described herein. Furthermore, in various embodiments, computer-executable instructions, i.e., software instructions, may be stored in the memory 204 for execution by the processor 202 to cause the processor 202 to perform one or more of the operations described herein (e.g., of the method 300, the method 400, etc.), such that the memory 204 is a physical, tangible, and non-transitory computer readable storage media. Such instructions often improve the efficiencies and/or performance of the processor 202 that is performing one or more of the various operations herein, whereby in performing the operations the computing device 200 is transformed into a special purpose computing device. In addition, one or more load files may be stored in memory 204, which include hardware descriptions that, when loaded to the processor 202 (or another processor), cause the processor 202 to be structured consistent with the descriptions herein (e.g., descriptions of gate array arrangements/configurations, etc.).

Further, the illustrated computing device 200 also includes a network interface 206 coupled to (and in communication with) the processor 202 (and/or the memory 204). The network interface 206 may include, without limitation, a wired network adapter, a wireless network adapter, a mobile network adapter, or other device capable of communicating to one or more different networks, for example, as included in the system 100. Further, in some exemplary embodiments, the computing device 200 includes the processor 202 and one or more network interfaces 206 incorporated into or with the processor 202.

FIG. 3 illustrates an exemplary method 300 for use processing an inbound request from a different region. The method 300 is described with reference to event gateway 108a of the system 100, and further with reference to the computing device 200. While described in connection with the event gateway 108a, it should be appreciated that the method 300 is also applicable to event gateway 108b. In addition, it should also be appreciated that the methods herein are not limited to the system 100 and computing device 200, and that the systems and computing device herein are similarly not limited to the method 300.

At the outset, the event gateway 108a receives, at 302, an HTTP request from the event gateway 108b, for example. The HTTP request includes a topic indicative of an application hosted at the data center 102a and a URL for the application. The HTTP request may further include a payload that includes actual business data for handling by the application hosted at the data center 102a, etc. The request may, for example, be a request for authorization of a transaction to a payment account issued by the user 110a, in FIG. 1. Alternatively, the request may relate to a service offered by the data centers 102a, 102b, alone or in connection with a payment account transaction. As shown in FIG. 3, the HTTP request is received specifically by the inbound HTTP handler 120 of the event gateway 108a.

In response, at 304, the inbound HTTP handler 120 validates the certificate included in the request and checks whether the certificate is issued by a trusted source, via MTLS, whereby the request is authenticated. In addition, as part of the validation, the inbound HTTP handler 120 may apply one or more rules (e.g., firewall rules, etc.) to the message, in order to detect any malicious content (e.g., virus, worms, malware, etc.).

At 306, then, the inbound HTTP handler 120 checks if the distinguished name (DN) of the certificate has authorization to provide HTTP requests to the application (indicated in the topic of the request) (e.g., to the endpoint, etc.), which is directed to the secure access handler 118 of the event gateway 108a. The secure access handler 118 validates, at 308, and secure access is authorized when the DN of the certificate has permission for access to the application to which the HTTP request is directed. At 310, the secure access handler 118 provides the validation result to the HTTP handler 120. When not valid, the inbound HTTP handler 120 halts. When valid, the inbound HTTP handler 120 calls, at 312, the protocol conversion handler 116 to convert the HTTP request to an event. The protocol conversion handler 116 converts the request to the event, whereby the topic name is the same as the resource name in the HTTP request (and URL therein), and provides the event to the event publisher 114, at 314. Because the topic name is the same as the resource name in this example implementation, the topic name may be considered as being included in the HTTP request and the URL therein. The event publisher 114 publishes the event to the message bus 104*a*, and provides a success confirmation, at 316, back to the protocol conversion handler 116, and then back to the inbound HTTP handler 120. The inbound HTTP handler 120 transmits, at 318, a result back to the event gateway 108*b*. The result includes message 200 for success, and a 403 rejection for a failure (e.g., when validation fails, etc.).

FIG. 4 illustrates an exemplary method 400 for use in processing an outbound request to a different region. The method 400 is described with reference to event gateway 108*a* of the system 100, and further with reference to the computing device 200. While described in connection with the event gateway 108*a*, it should be appreciated that the method is also applicable to event gateway 108*b*. In addition, it should also be appreciated that the methods herein are not limited to the system 100 and computing device 200, and that the systems and computing device herein are similarly not limited to the method 400.

In method 400, at the outset, the event gateway 108*a* (and in particular, the event handler 112 thereof) identifies, at 402, an event directed to an application in a different region, for example, via the hostname included in the event. In turn, the event handler 112 provides the event to the protocol conversion handler 116, at 404, whereby a HTTP request is constructed or converted consistent with the regulatory domain of Region A based on associated policies and/or regulations, for example (e.g., remove or tokenize specific information, etc.). That is, certain information from the network message in the event may be limited based on the event being directed out of Region A. At 406, the protocol conversion handler 116 returns the HTTP request to the event handler 112. The event handler 112 then provides the HTTP request to the outbound HTTP handler 122, which transmits the HTTP request to, for example, the event gateway 108*b*. The event gateway 108*b* proceeds generally consistent with method 300, whereupon a result is passed back to the event gateway 108*a*.

Referring again to method 400, the outbound HTTP handler 122 receives the result, and specifically, a response code, and returns, at 410, the response code to the event handler 112. If the response code is a non 200 code, the event handler 112 publishes an error to an error topic (such as a logging topic), at 412, indicating that the response code was a non 200 code. In various implementations, events from logging topics may be consumed by a monitoring system (such as Splunk, etc.). At 414, the event handler 112 publishes an event to the local message bus (e.g., if the response code was a proper 200 code, etc.), via the event publisher 114. The event handler 112 then receives a return success or failure from the event publisher 114, at 416. If a failure is returned, the event handler 112 may publish an error to an error topic, at 418, indicating that a failure occurred at the event publisher 114.

Again and as previously described, it should be appreciated that the functions described herein, in some embodiments, may be described in computer executable instructions stored on a computer readable media, and executable by one or more processors. The computer readable media is a non-transitory computer readable storage medium. By way of example, and not limitation, such computer-readable media can include RAM, ROM, EEPROM, CD-ROM or other optical disk storage, magnetic disk storage or other magnetic storage devices, or any other medium that can be used to carry or store desired program code and/or load files (prior to implementation in hardware) in the form of instructions or data structures and that can be accessed by a processor, and/or implemented in hardware. Combinations of the above should also be included within the scope of computer-readable media.

It should also be appreciated that one or more aspects of the present disclosure transforms a general-purpose computing device into a special-purpose computing device when configured to perform the functions, methods, and/or processes described herein.

As will be appreciated based on the foregoing specification, the above-described embodiments of the disclosure may be implemented using computer programming or engineering techniques including computer software, firmware, hardware or any combination or subset thereof, wherein the technical effect may be achieved by performing one or more of: (a) receiving, by a first event gateway computing device disposed in a first region, a network message from a second event gateway computing device in a second region, via a persistent connection between the first event gateway computing device and the second event gateway computing device; (b) validating, by the first event gateway computing device, the network message based on at least a certificate associated with the network message; (c) in response to validating the network message, converting, by the first gateway computing device, the network message to an event; and (d) publishing, by the first gateway computing device, the event to a message bus, thereby providing the event associated with the network message to a service to which the network request is directed.

Exemplary embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular exemplary embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When a feature is referred to as being "on," "engaged to," "connected to," "coupled to," "associated with," "included with," or "in communication with" another feature, it may be directly on, engaged, connected, coupled, associated, included, or in communication to or with the other feature, or intervening features may be present. As used herein, the term "and/or" and the phrase "at least one of" includes any and all combinations of one or more of the associated listed items.

Although the terms first, second, third, etc. may be used herein to describe various features, these features should not be limited by these terms. These terms may be only used to distinguish one feature from another. Terms such as "first," "second," and other numerical terms when used herein do not imply a sequence or order unless clearly indicated by the context. Thus, a first feature discussed herein could be termed a second feature without departing from the teachings of the example embodiments.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

The foregoing description of exemplary embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A network for use in providing messaging among different regions, the network comprising:
   at least one event gateway for coupling to a message bus in a first region, wherein the at least one event gateway is configured to:
   receive a network message from a different event gateway in a different region, via a persistent connection between the at least one event gateway and the different event gateway;
   validate the network message based on a certificate included in the network message being issued by a trusted source;
   determine whether a distinguished name (DN) in the certificate is authorized to access a service to which the network measage is directed; and
   in response to validation of the network message and determination that the DN is authorized to access the service:
   convert the network message to an event; and
   publish the event to an event topic on the message bus, wherein the event topic is specific to a service, thereby providing the event associated with the network message to the service to which the network message is directed.

2. The network of claim 1, wherein the network message includes an HTTP request; and
   wherein the network message is received via a persistent connection consistent with an HTTP/2 connection with the different event gateway.

3. The network of claim 1, wherein the at least one event gateway is configured to establish the persistent connection with the different event gateway, based on a hostname included in an event to the message bus, prior to receiving the network message from the different event gateway.

4. The network of claim 1, wherein the at least one event gateway is configured, in order to validate the network message, to:
   determine that the network message is authentic based on mutual transport layer security (MTLS) with the different event gateway.

5. The network of claim 4, wherein the at least one event gateway is configured, in order to validate the network message, to check the network message for malicious content based on one or more rules.

6. A computer-implemented method for use in providing messaging among different regions, the method comprising:
   receiving, by a first event gateway computing device disposed in a first region, a network message from a second event gateway computing device in a second region, via a persistent connection between the first event gateway computing device and the second event gateway computing device;
   validating, by the first event gateway computing device, the network message based on a certificate in the network message being issued by a trusted source;
   determining, by the first event gateway computing device, whether a distinguished name (DN) in the certificate is authorized to access a service to which the network message is directed; and
   in response to validating the network message and determining the DN is authorized to access the service:
   converting, by the first gateway computing device, the network message to an event; and
   publishing, by the first gateway computing device, the event to an event topic on a message bus, wherein the event topic is specific to a service, thereby providing the event associated with the network message to the service to which the network request is directed.

7. The computer-implemented method of claim 6, wherein the network message includes an HTTP request; and
   wherein receiving the network message includes receiving, by an HTTP handler of the first event gateway computing device, the network message via an HTTP/2 connection with the second event gateway computing device.

8. The computer-implemented method of claim 7, wherein validating the network message is further based on:
   determining, by a secure access handler of the first event gateway computing device, that the network message is authentic based on mutual transport layer security (MTLS) with the second event gateway computing device.

9. The computer-implemented method of claim 6, further comprising establishing, by the first event gateway computing device, the persistent connection with the second event gateway computing device based on a hostname included in an event published to the message bus, prior to receiving the network message from the second event gateway computing device.

10. The computer-implemented method of claim 6, wherein validating the network message includes checking the network message for malicious content based on one or more rules.

11. A non-transitory computer-readable storage media including executable instructions, which when executed by at least one processor of a first event gateway computing device in a first region, cause the at least one processor to:

receive a network message from a second event gateway computing device in a second region, via a persistent connection between the first event gateway computing device and the second event gateway computing device;

validate the network message based on a certificate included in the network message being issued by a trusted source;

determine whether a distinguished name (DN) in the certificate is authorized to access a service to which the network message is directed; and in response to validation of the network message and determination that the DN is authorized to access the service:

convert the network message to an event; and publish the event to an event topic on a message bus, wherein the event topic is specific to a service, thereby providing the event associated with the network message to the service to which the network request is directed.

12. The non-transitory computer-readable storage media of claim 11, wherein the executable instructions, when executed by the at least one processor, cause the at least one processor, in connection with validating the network message, to:

determine the network message is authentic based on mutual transport layer security (MTLS) with the second event gateway computing device.

13. The non-transitory computer-readable storage media of claim 11, wherein the executable instructions, when executed by the at least one processor, cause the at least one processor, in connection with converting the network message to an event, to limit certain information from the network message in the event based on a region to which the event is directed.

* * * * *